United States Patent Office

2,893,972
Patented July 7, 1959

2,893,972

STABILIZATION OF POLYOXYMETHYLENE WITH UREAS AND THIOUREAS

Michael Andrew Kubico, Newark, and Robert Neal MacDonald, Wilmington, Del., assignors to E. I. du Pont de Nemours and Company, Wilmington, Del., a corporation of Delaware No Drawing. Application November 23, 1956
Serial No. 624,175

7 Claims. (Cl. 260—45.8)

This invention relates to thermally stabilized, high molecular weight polyoxymethylene, and, more specifically, it relates to such a polyoxymethylene stabilized with ureas or thioureas.

This is a continuation-in-part of copending application, Serial No. 327,694, filed by M. A. Kubico and R. N. MacDonald on December 23, 1952, and now abandoned.

In U.S. Patent 2,768,994, issued to R. N. MacDonald on October 30, 1956, there is described and claimed a normally solid, synthetic, high molecular weight polyoxymethylene meeting either of two tests relating to thermal stability. The first test requires that the polyoxymethylene have a degree of toughness of at least 1, and this test is conducted by the consecutive steps of compression-molding a film of the polymer 3–7 mils in thickness, heating the film at 105° C. for 7 days in air, cooling the film to room temperature, and, while at room temperature, manually folding and creasing the film along a line followed by manually folding and creasing the film in the reverse direction along the same line without a break occurring in the film along that line. The second test requires that the polyoxymethylene have a reaction rate constant for thermal degradation at 222° C. of less than 1% by weight per minute, the thermal degradation taking place in a vessel open to the atmosphere. In copending applications Serial Numbers 365,-234 Patent No. 2,841,570; 365,235 Patent No. 2,828,-286; and 365,278 filed June 30, 1953, Patent No. 2,844,-561 there are disclosed methods of preparing novel polyoxymethylenes which can be formed in tough, flexible films that retain their toughness and flexibility over long periods of time. The prior art teaches that polyoxymethylenes of moderately high molecular weight can be made which initially possess desirable properties. These known polymers can be formed into films or other articles that are tough and flexible, but the polymer degrades quickly when heated at elevated temperatures, e.g., 105° C., as evidenced by the generation of formaldehyde fumes and embrittlement of films prepared therefrom.

It is an object of the present invention to provide, as a new composition of matter, a high molecular weight polyoxymethylene of improved thermal stability. It is another object of this invention to provide ureas or thioureas as stabilizers which can be incorporated into polyoxymethylene having a degree of toughness of at least 1 or having a reaction rate constant for thermal degradation at 222° C. of less than 1% by weight per minute, and thereby to impart to the polyoxymethylene an improved thermal stability. It is another object of this invention to provide methods of incorporating stabilizing compounds into preformed polyoxymethylene so as to produce a modified polyoxymethylene having improved toughness, flexibility, and stability.

The above objects are accomplished by intimately associating 0.001%–10% by weight of a thermal stabilizer from the group consisting of urea, thiourea, and certain substituted ureas or thioureas into a normally solid, synthetic, high molecular weight polyoxymethylene having a degree of toughness of at least 1, or having a reaction rate constant for thermal degradation at 222° C. of less than 1% by weight per minute. The stabilizers include urea, thiourea, and either of these compounds substituted by hydrocarbon groups, alkoxyhydrocarbon groups, halohydrocarbon groups, or heteroxy hydrocarbon groups.

One convenient way for preparing the new compositions of this invention is to dissolve the stabilizer in a volatile solvent therefor and then add an amount of solution to the polymer sufficient to provide up to about 10 percent of the stabilizer based on the weight of the polymer. The solvent thereafter may be removed conveniently by evaporation. Another convenient way for preparing the compositions of this invention is to add the stabilizer in a dry form to the polyoxymethylene, melt the dry mixture, and subject the melted mixture to the action of milling rolls.

It is believed that the chain of a polyoxymethylene having recurring —$CH_2O$— units is subject to attack by three separate mechanisms. Firstly, the hydrogen atoms are subject to an oxidative attack by oxygen or by free radicals having an oxidative tendency. Secondly, the oxygen of the polymer chain is subject to hydrolytic attack by hydrogen ion or its equivalent. Experimental evidence indicates that both the oxidative and hydrolytic attack cause chain cleavage of the polymer. The third attack is one which is believed to start at the end of a polymer chain to cause an unzippering effect, in that the end formaldehyde unit is broken away and then the next unit, and so on until a strong unit is reached that will not break away. These three mechanisms may be inhibited by the presence of scavenger compounds for destroying free oxidative radicals and compounds causing hydrolytic attack, and by the formation of strong end groups on the polymer chain. The stabilizing compounds of this invention are useful in scavenging the oxidative radicals from the polymer environment, and in helping to prevent hydrolytic attack. In addition, the presence of ureas inhibits the formation of odors which might occur during the storage of polyoxymethylene, and aids in destroying the color-forming tendencies of some additives in the polymer.

The examples which follow are to illustrate and not to limit this invention. Percentage weight loss is used as one criterion of stability, representing the percentage lost in weight after heating the polymeric composition in a circulating oven for the period of time shown. Unless designated otherwise, the temperature of the oven is 180° C. The other measure of thermal stability is the reaction rate constant for thermal degradation at 222° C. which may be determined according to the procedure described in U.S. Patent 2,768,994.

EXAMPLE 1

A ten-gram sample of polyoxymethylene, prepared by bulk polymerization as described hereinafter, was mixed with 0.2 gram of urea dissolved in 20 cc. of water. This mixture was allowed to stand for about 15 hours after which time the water was removed by heating under vacuum at about 60° C. The sample was then heated in a vacuum at 135° for one hour to prepare the stabilized sample for a weight loss test. The urea-treated sample was then heated in air at 180° C. for ½ hour. The weight of the sample measured before and after this 180° C./0.5 hour treatment showed that the sample lost 10.7 percent of its weight during the 180° treatment. An unstabilized control sample of the polymeric formaldehyde used in this experiment was subjected to the same preparation and weight loss test and was found to have lost 14.6 percent of its weight in the test.

The polymer used in this example was prepared by pyrolyzing alpha-polyoxymethylene at 165° C. and 100 mm. pressure, passing the pyrolysis vapors through two conventional cold traps maintained at about −30° C., condensing the vapors and allowing the liquid formaldehyde to stand at −80° C. until polymerization was complete. The above procedure is known as bulk polymerization. The polymer was then ground to about 20-mesh size and heated at 140° C. for four hours under 2 mm. of vacuum and was then ready for use in the above-described experiment.

EXAMPLE 2

A nine-gram sample of polymeric formaldehyde prepared by a bulk polymerization method as described in Example 1 was mixed with a solution of 0.18 gram of N,N′-bis(methoxymethyl) urea dissolved in 25 cc. of methanol. The mixture was allowed to stand for about 15 hours, the solvent was removed by evaporation at about room temperature, and the polymer was then dried in a vacuum oven at about 60° C. The sample was further treated by heating at 135° for one hour in a vacuum oven as a pretreatment for the weight loss test. The sample was then subjected to the same weight loss test as described in Example 1, namely, heating at 180° C. for ½ hour. The sample lost 7.9 percent of its weight in this 180° test. An unstabilized sample of the same polymer subjected to the same weight loss test lost 16.5 percent of its weight.

EXAMPLE 3

Samples were prepared by mixing 9 grams of polyoxymethylene, prepared as described below, with solutions of 0.18 gram of stabilizer in 50 cc. of solvent. In the case of phenyl thiourea, the solvent was 40 cc. of ether and 10 cc. of methanol. In the case of thiourea, the solvent was 50 cc. of methanol. These samples were allowed to stand for about 15 hours, after which time the solvent was removed by drying under vacuum at about 60° C. The samples were pretreated by heating them in a vacuum oven at 135° C. for one hour, after which time the samples were subjected to the weight loss test by heating them at 180° C. for ½ hour. An unstabilized control sample of the polymer used in this experiment was subjected to the same pretreatment and weight loss test. The results of this test are shown in Table 1.

Table 1

| Stabilizer: | Percent weight loss, 180° C./0.5 hr. |
|---|---|
| None | 19.8 |
| Phenylthiourea | 12.6 |
| Thiourea | 9.8 |

The polymer used in this example was prepared from monomeric formaldehyde produced by pyrolyzing alpha-polyoxymehtylene. The pyrolysis vapors were passed through a series of U-tubes maintained at about −30° C., after which the formaldehyde was dissolved in diethyl ether at about −75° C. The solution was allowed to stand at this temperature until a small amount of polyoxymethylene had formed. The solution was then filtered to remove the polymer which had formed spontaneously, and to the clear filtrate there was added .01 percent of n-butylamine based on the weight of the diethyl ether used. This polymer precipitated from the solution as a fine, white, powder and after drying was used in the experiment described in this example.

EXAMPLE 4

In this series of experiments various stabilizing compounds, listed in Table 2 below, were added to polyoxymethylene on milling rolls. The polyoxymethylene was prepared by bulk polymerization as described in Example 1. The amount of stabilizer was 2 percent of the weight of polyoxymethylene. The mill was a standard laboratory mill having two electrically heated rolls 2 inches in diameter by 6 inches long, one roll being maintained at 180° C. while the other was at 190° C. Each mixture of polymer and stabilizer was milled for exactly three minutes and the percentage weight loss was determined based on the weight of the mixture before and after milling. For a comparison, two unstabilized samples of the same lot of polyoxymethylene were subjected to the milling action to determine their weight loss in this test. In Table 2 the results of these experiments are tabulated.

Table 2

| Stabilizer: | Percent weight loss due to milling for 3 minutes |
|---|---|
| None | 23 |
| None | 20 |
| n-Butyl urea | 5 |
| N,N-diethyl urea | 15 |
| Dicyclohexyl urea | 14 |
| Ethanol urea | 12 |
| N-cyanomethyl urea | 4 |
| Benzoyl urea | 12 |
| Bis(acetyl thiomethyl) urea | 6 |
| Thiourea | 10 |
| Phenyl thiourea | 2 |
| Ethylene thiourea | 9 |
| s-Diphenyl thiourea | 7 |
| Di-o-tolyl thiourea | 6 |
| p-Chlorophenyl thiourea | 6 |
| p-Methoxyphenyl thiourea | 4 |
| o-Tolyl thiourea | 5 |
| N,N′-bis(isobutyl) thiourea | 10 |
| Dibutyl thiourea | 11 |
| N,N′-tetramethylene thiourea | 8 |
| Tetramethyl thiourea | 4 |
| Bis(alpha-naphthyl) thiourea | 3 |
| N,N′-bis(n-butyl) thiourea | 8 |
| s-Bis(2-methyl-3-chlorophenyl) thiourea | 1 |
| Bis(3-benzofuryl) thiourea | 5 |

EXAMPLE 5

A composition of high molecular weight acetylated polyoxymethylene and 0.1% by weight of beta-conidendrol was tested to see whether the addition of urea or n-butyl urea would improve its thermal stability. In each case a solution of the urea compound was added in an amount such that upon evaporaiton of the solvent 0.1% by weight of the composition was the urea additive. After drying overnight at 70° C. in a vacuum, the composition was subjected for 10 minutes to the action of milling rolls maintained at 195° C., and then tested to determine the reaction rate constant for thermal degradation at 222° C. of each composition.

The results are shown in Table 3 and the rate constant is shown based upon the measurements made in the first 10 minutes and the second 10 minutes of the degradation at 222° C.

Table 3

| Amount of Urea Stabilizer | Reaction Rate Constant For Thermal Degradation At 222° C. | |
|---|---|---|
| | First 10 Minutes, percent/minute | Second 10 Minutes, percent/minute |
| None | 0.11 | 0.45 |
| 0.1% urea | 0.08 | 0.25 |
| 0.1% n-butyl urea | 0.06 | 0.10 |

The stabilizers which have been found to be useful in this invention include urea, thiourea, substituted ureas and substituted thioureas where the substitution group may be hydrocarbon, alkoxyhydrocarbon, cyanohydrocarbon, halohydrocarbon, or heterocyclic oxahydrocarbon. Specific examples of desirable ureas and thioureas for stabilizing polyoxymethylene include, but are not limited to, the following compounds: urea, N,N'-bis-(methoxymethyl) urea, n-butyl urea, N,N-diethyl urea, dicyclohexyl urea, ethanol urea, N-cyanomethyl urea, benzoyl urea, bis(acetylthiomethyl) urea, thiourea, phenyl thiourea, ethylene thiourea, s-diphenyl thiourea, di-o-tolyl thiourea, p-chlorophenyl thiourea, p-methoxyphenyl thiourea, o-tolyl thiourea, N,N'-bis(isobutyl) thiourea, dibutyl thiourea, N,N'-tetramethylene thiourea, bis(alpha-naphthyl) thiourea, tetramethyl thiourea, N,N'-bis-(n-butyl) thiourea, s-bis(2-methyl-3-chlorophenyl) thiourea, and bis(3-benzofuryl) thiourea.

The amount of stabilizer which may be added to the unstabilized polyoxymethylene can vary from about 0.001 percent to about 10 percent of the weight of the polymer. In most cases, however, from about 0.1 percent to about 5 percent of the stabilizer has been found to be sufficient to protect the polymer from excessive thermal decomposition and such limits therefore constitute the preferred limits.

The urea stabilizer may be incorporated into the polymer in any manner well known to those skilled in the art. A convenient way is to dissolve the stabilizer in a volatile solvent, preferably one which is also at least a partial solvent for the polyoxymethylene, and to steep the polymer in this solution. Thereafter, the solvent may be removed by evaporation, desirably under reduced pressure. As an alternative method, the stabilizer may be added to the polymer and the blend then homogenized by milling at a temperature above the melting point of the polymer. Another method is to add stabilizer to the polymer at the melting point of the polymer. In still another alternative procedure, the blend may be made by dissolving the stabilizer in a solvent and adding the resultant product to a solution of the polymer in the same solvent. In still another method the stabilizer may be added to the polymerization system before or after the polymer has formed, but before isolation of the polymer.

As illustrated by the examples, the compositions of this invention are outstanding in their resistance to degradation at elevated temperatures and in their retention to toughness.

The stabilized compositions of this invention are useful for conversions to films, fibers, molded articles, and the like, by melt extrusion, compression molding, injecting molding, and other fabrication methods known in the art.

We claim:

1. The thermally stabilized polyoxymethylene composition which comprises a normally solid, synthetic, high molecular weight polyoxymethylene selected from the group consisting of (1) polyoxymethylenes having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and (2) polyoxymethylenes failing to exhibit a degree of toughness of at least 1, but having a reaction rate constant for thermal degradation at 222° C. of less than 1% by weight per minute, measured by thermally degrading said polyoxymethylene in a vessel open to the atmosphere; and 0.001%–10% by weight of said polyoxymethylene of a thermal stabilizing compound from the group consisting of urea, thiourea, hydrocarbon - substituted urea, alkoxyhydrocarbon - substituted urea, cyanohydrocarbon-substituted urea, halohydrocarbon-substituted urea, heterocyclic oxahydrocarbon-substituted urea, hydrocarbon-substituted thiourea, alkoxyhydrocarbon-substituted thiourea, cyanohydrocarbon-substituted thiourea, halohydrocarbon - substituted thiourea, and heterocyclic oxahydrocarbon-substituted thiourea; said thermally stabilized polyoxymethylene composition being characterized in that said composition exhibits a greater degree of thermal stability than does said polyoxymethylene in the absence of said thermal stabilizing compound.

2. The thermally stabilized polyoxymethylene composition which comprises a normally solid, synthetic, high molecular weight polyoxymethylene having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and while maintaining said film at room temperature, manually folding and creasing said film along a line, and manually folding and creasing said film in the reverse direction along the same line without a break occurring in the film along said line, and 0.001%–10% by weight of said polyoxymethylene of a thermal stabilizing compound from the group consisting of urea, thiourea, hydrocarbon-substituted urea, alkoxyhydrocarbon-substituted urea, cyanohydrocarbon-substituted urea, halohydrocarbon-substituted urea, heterocyclic oxahydrocarbon-substituted urea, hydrocarbon-substituted thiourea, alkoxyhydrocarbon-substituted thiourea, cyanohydrocarbon-substituted thiourea, halohydrocarbon-substituted thiourea, and heterocyclic oxahydrocarbon-substituted thiourea; said thermally stabilized polyoxymethylene composition being characterized in that said composition exhibits a greater degree of thermal stability than does said polyoxymethylene in the absence of said thermal stabilizing compound.

3. The thermally stabilized polyoxymethylene composition which comprises a normally solid synthetic, high molecular weight polyoxymethylene having a reaction rate constant for thermal degradation at 222° C. of less than 1% by weight per minute, measured by thermally degrading said polyoxymethylene in a vessel open to the atmosphere, and 0.001%–10% by weight of said polyoxymethylene of a thermal stabilizing compound from the group consisting of urea, thiourea, hydrocarbon-substituted urea, alkoxyhydrocarbon-substituted urea, cyanohydrocarbon-substituted urea, halohydrocarbon-substituted urea, heterocyclic oxahydrocarbon-substituted urea, hydrocarbon-substituted thiourea, alkoxyhydrocarbon-substituted thiourea, cyanohydrocarbon-substituted thiourea, halohydrocarbon-substituted thiourea, and heterocyclic oxahydrocarbon-substituted thiourea; said thermally stabilized polyoxymethylene composition being characterized in that said composition exhibits a greater degree of thermal stability than does said polyoxymethylene in the absence of said thermal stabilizing compound.

4. The composition of claim 3 in which said reaction rate constant is less than 0.5% by weight.

5. The thermally stabilized polyoxymethylene composition which comprises a normally solid, synthetic, high molecular weight polyoxymethylene having a degree of toughness of at least 1 determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and said polyoxymethylene also exhibiting a reaction rate constant for thermal degradation at 222° C. of less than 1% by weight per minute measured by thermally degrading said polyoxymethylene in a vessel open to the atmosphere, and 0.1%–5% by weight of a thermal stabilizing compound from the group consisting of urea, thiourea, hydrocarbon-substituted urea, alkoxyhydrocarbon-substituted urea, cyanohydrocarbon-substituted urea, halohydrocarbon-substituted urea, heterocyclic oxahydrocarbon-substituted urea, hydrocarbon-substituted thiourea, alkoxyhydrocarbon-substituted thiourea, cyanohydrocarbon-substituted thiourea, halohydrocarbon-substituted thiourea, and heterocyclic oxahydrocarbon-substituted thiourea; said thermally stabilized polyoxymethylene composition being characterized in that said composition exhibits a greater degree of thermal stability than does said polyoxymethylene in the absence of said thermal stabilizing compound.

6. A film comprising the thermally stabilized composition of claim 1.

7. A fiber comprising the thermally stabilized composition of claim 1.

References Cited in the file of this patent

UNITED STATES PATENTS

| | | |
|---|---|---|
| 2,000,152 | Walker | May 7, 1935 |
| 2,768,994 | MacDonald | Oct. 30, 1956 |

OTHER REFERENCES

"Chemical Abstracts," December 25, 1952, vol. 46, No. 24, page 5888. (Copy in Scientific Library.)

UNITED STATES PATENT OFFICE

CERTIFICATE OF CORRECTION

Patent No. 2,893,972                                                  July 7, 1959

Michael Andrew Kubico et al.

It is hereby certified that error appears in the printed specification of the above numbered patent requiring correction and that the said Letters Patent should read as corrected below.

Column 2, line 7, after "groups,", first occurrence, insert -- cyanohydrocarbon groups, --.

Signed and sealed this 10th day of November 1959.

(SEAL)
Attest:

KARL H. AXLINE
Attesting Officer

ROBERT C. WATSON
Commissioner of Patents